June 3, 1958   J. SNYDER   2,837,730
DEFLECTION METHOD FOR CATHODE-RAY TUBE
Filed Aug. 4, 1952
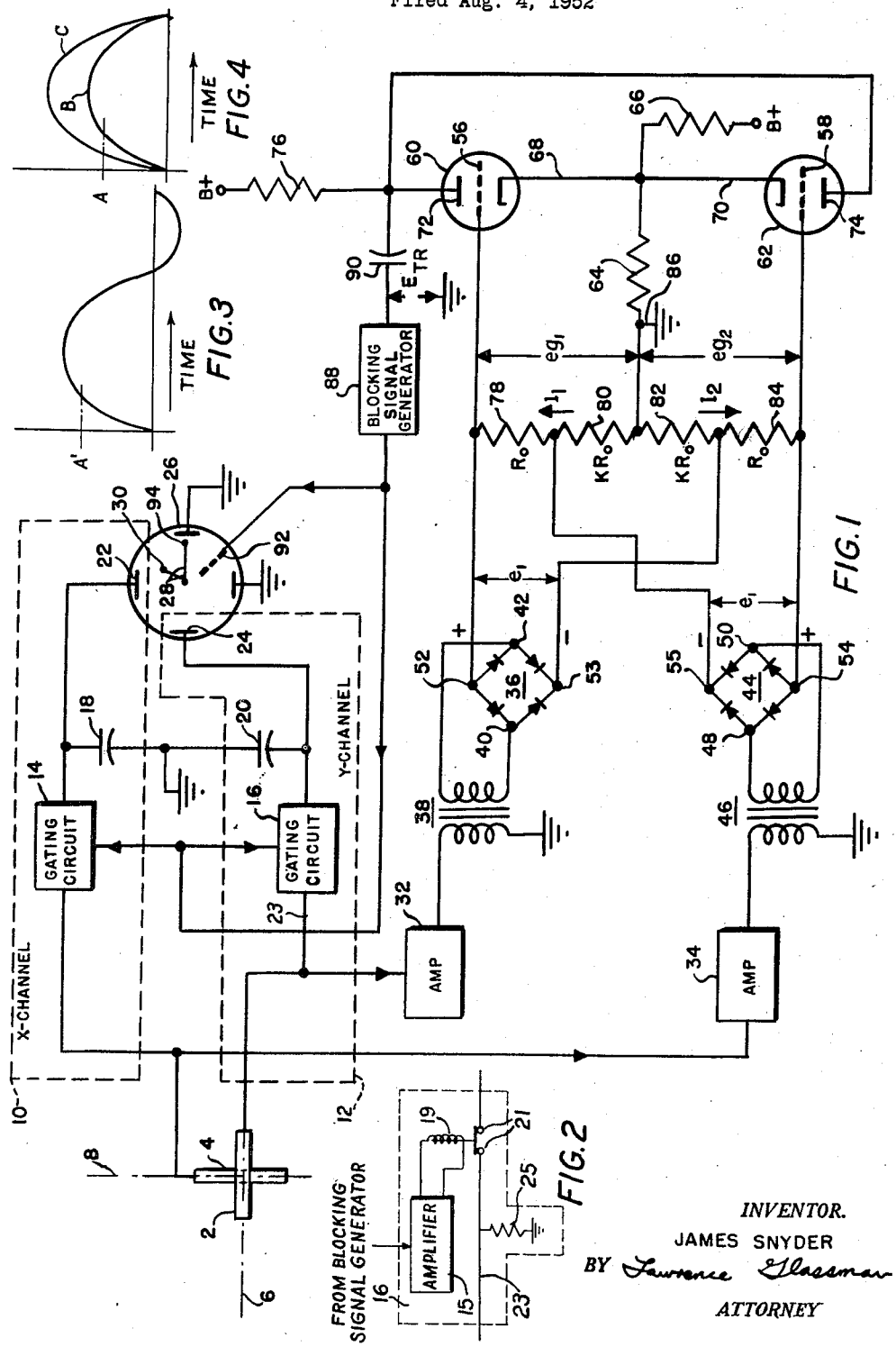
INVENTOR.
JAMES SNYDER
BY Lawrence Glassman
ATTORNEY

United States Patent Office 2,837,730
Patented June 3, 1958

2,837,730

DEFLECTION METHOD FOR CATHODE-RAY TUBE

James Snyder, Asbury Park, N. J., assignor to the United States of America as represented by the Secretary of the Army Application August 4, 1952, Serial No. 302,642

7 Claims. (Cl. 340—16)

(Granted under Title 35, U. S. Code (1952), sec. 266)

The invention described herein may be manufactured and used by or for the Government for governmental purposes, without the payment to me of any royalty thereon.

The invention relates to sound locating systems and more particularly to the location of the point of origin of an explosion wave. While the invention is subject to a wide range of applications, it is especially suited for use in connection with a sound locating system and will be particularly described with such apparatus.

It is well known that the bearing of an explosion wave may be obtained without ambiguity by the use of two coincident pressure gradient type microphones having their axes of sensitivity disposed in quadrature. It is characteristic of such microphones that the magnitude of the electrical output for any sound pressure is proportional to the cosine of the angle of sound incidence. The combined electrical output from the microphones is usually resolved in a cathode ray tube indicator and the azimuth of the point or origin of the explosion wave is indicated by a line radially deflected from the center of the screen and extending to an intensified spot.

In my copending application Serial Number 299,775 filed July 18, 1952, now U. S. Patent No. 2,755,414, granted July 17, 1956, there is shown a pulse stretching and indicating system for detecting and visually representing the polarity and amplitude of the initial pulse of a voltage wave train on an indicator. The channels X and Y illustrated in the copending application may represent the outputs from a pair of pressure gradient microphones having their axes of sensitivity disposed in quadrature. Each of the two channels includes identical gating circuits and a voltage storing device. The gating circuits are simultaneously triggered into operation by the output of a blocking oscillator which in turn is triggered at a predetermined input voltage amplitude level of one of the two applied input voltages. After the gating circuits in both channels are opened by the output of the blocking signal generator, the ratio between both applied signals at the instant of gating is maintained by the storage devices in each channel. In such an arrangement, the position of the intensified spot on the indicator along a radial line may be determined by the amplitude of the signals applied to the channels. For explosion wave signals arriving along the axis of either one of the quadrature disposed microphones, the radial distance of the spot from the center of the indicator screen may represent unity or maximum amplitude. However, for explosion signals arriving at an angle, 45° for example, with respect to the axes of the microphones, the intensified spot will no longer be at maximum or unity amplitude indication but will be closer to the center of the indicator. To provide more accurate azimuth readings for signals of equal intensity irrespective of the angle of sound incidence, it is desirable that the position indicating intensified spot be at substantially constant radial distance from the center of the indicator screen.

It is therefore an object of this invention to provide a circuit having a substantially constant output irrespective of the angle of incidence of the explosion wave.

It is another object of the invention to provide a circuit for producing a voltage the amplitude of which is independent of the angle of incidence of the explosion wave.

In accordance with the present invention, there is provided a pair of directional microphones of the cosine type having their axes of sensitivity disposed in quadrature for detecting explosion waves and means for rectifying the outputs of the microphones. Four resistors are connected in series across the relatively positive output terminals of the rectifiers, said resistors being connected to the relatively negative terminals of the rectifiers in such a manner that the direct current output of one rectifier flows through the two inner resistors and one end resistor in a prescribed direction, and the direct current output of the other rectifier flows through the two inner resistors and the other end resistor in a direction opposite to said prescribed direction. The voltage signals developed across one end resistor and an adjacent inner resistor is applied to the input circuit of a first vacuum tube, and the voltage signals developed across the other end resistor and an adjacent inner resistor is applied to the input circuit of a second vacuum tube, both tubes being normally nonconductive. The end resistors are of equal value and each of the inner resistors are made a predetermined decimal fraction of the magnitude of one end resistor. The predetermined fraction is so chosen that the combined output of said vacuum tubes provides signals of substantially constant amplitude for explosion waves of equal intensity irrespective of the angle of incidence of said waves.

For a better understanding of the invention together with other and further objects thereof, reference is had to the following description taken in connection with the accompanying drawing, and its scope will be pointed out in the appended claims.

In the drawing, Figure 1 is a schematic diagram of the invention; Figure 2 illustrates one type of gating circuit utilized in Figure 1, and Figures 3 and 4 are explanatory curves.

Referring now to the drawing, there is shown at 2 and 4 a pair of pressure gradient type microphones, preferably of the hot-wire type, having their axes of sensitivity 6 and 8 disposed in quadrature. The respective outputs from microphones 2 and 4 are applied to similar channels 10 and 12, designated X and Y as shown. These channels are described in the aforementioned application and include gating circuits 14 and 16 and condensers 18 and 20 for storing electric charges which are applied to deflection plates 22 and 24 of cathode ray tube indicator 26. As shown in Figure 2 each of the gating circuits comprises an amplifier 15 feeding a fast acting relay 19 having normally closed contacts 21. Signals from microphones 2 and 4 charge storage capacitors 18 and 20 through the lines 23 and gating circuits 14 and 16, respectively. During the charging period, line 28 on cathode ray tube 26 assumes a position which is the resultant of the ratios of the amplitudes of the applied signals. When a predetermined amplitude of either applied signal is reached, the gating amplifiers are pulsed into conduction thereby opening contacts 21 and thus the charge on each storage capacitor is maintained until the gating amplifiers are again rendered conductive and are discharged through a resistor 25. The structure and operation of the gating circuits are described in the aforementioned application. The indication on cathode ray tube 26 will be a dim line 28 extending to a bright spot 30 from the center of the screen. As described in the aforementioned copending application, the position of spot 30 will be determined by the ratio between the amplitudes of the signals applied to the X and Y channels. The quiescent position of spot 30 is normally at the center of cathode ray tube 26 and may be operated at very low brilliance level.

In accordance with the present invention the output signals from microphones 2 and 4 are respectively coupled to amplifiers 32 and 34. The output from amplifier 32 is applied to full-wave rectifier 36 through a transformer 38 having its secondary winding connected across input terminals 40 and 42 of said rectifier. Similarly, the output from amplifier 34 is applied to full-wave rectifier 44 through a transformer 46 having its secondary winding connected across input terminals 48 and 50 of rectifier 44. The relative positive output terminals 52 and 54 of rectifiers 36 and 44 are respectively connected to control grids 56 and 58 of vaccum tubes 60 and 62 which are normally biased to cut-off by means of potential dividing resistors 64 and 66. As shown, cathodes 68 and 70 are connected to the junction of seriated resistors 64 and 66 connected between ground and B+. The respective tube plates 72 and 74 are connected to B+ through common plate load resistor 76.

Connected between grids 56 and 58 there is provided four serially arranged resistors 78, 80, 82 and 84. End resistances 78 and 84 are equal and the inner resistances 80 and 82 are also equal, each of the inner resistors, however, being a predetermined decimal fraction of the resistance value of end resistor 78 or 84. For convenience the end resistors are designated as $R_0$ and the inner resistances are designated as $KR_0$ where "K" represents a predetermined decimal fraction, the value of which will be calculated below. The relative negative output terminal 53 of rectifier 36 is connected to the junction of resistors 82 and 84 while the relative negative output terminal 55 of rectifier 44 is connected to the junction of resistors 78 and 80. The junction of inner resistors 80 and 82 is grounded as at 86. By this arrangement, the current $I_1$ from rectifier 36 flows through resistors 82, 80 and 78 in the direction shown, while the current $I_2$ from rectifier 44 flows through resistors 80, 82 and 84 in the opposite direction.

A blocking signal generator 88 is connected to joined plates 72 and 74 through a blocking condenser 90. The signal generator 88 may comprise a monostable multivibrator, often referred to as a one-shot multivibrator. However, this circuit is not limited to a multivibrator, but may include any triggered circuit that produces a pulse of predetermined width. The output of generator 88 is applied to the deflection plates of indicator 26 through gating circuits 14 and 16, respectively, and simultaneously to the control grid 92 of indicator 26. Signal generator 88 may be so arranged that it will be triggerd into operation only when a voltage of predetermined amplitude is applied thereto from the combined output of tubes 60 and 62 as explained hereinbelow.

In operation, it is to be assumed that the angular position of intensified spot 30 on indicator 26 represents the point of origin of an explosion wave signal. For signals of a given intensity arriving along the axis of one microphone, the radial deflection of the spot 30 may be set at a maximum on the screen of indicator 26. For example, the azimuth of the point of origin of an explosion wave arriving along the axis of microphone 2 may be indicated as at point 94 on indicator 26. Under these conditions, the initial incoming signal is applied to amplifier 32, rectified by rectifier 36 and applied as an input voltage to tube 60, which now becomes conductive, and a triggering pulse is applied to blocking signal generator 88 for operating gate circuit 16. The input circuit of generator 88 is preset so that it is triggered at an amplitude such that for a signal of given intensity arriving along the axis of microphone 2, the radial deflection of spot 30 will terminate at the outer edge of the screen of indicator 26. Obviously, no signal is derived from microphone 4 under these conditions. Thus when the output from tube 60 reaches a prescribed level, generator 88 will be triggered into operation to open gating circuit 16. For incoming signals of equal intensity, the triggering amplitude will be reached at the same time. This is clearly illustrated in Figures 3 and 4. Figure 3 illustrates the incoming signal applied to amplifier 32 from the microphone. Figure 4 illustrates the triggering output signal from tube 60 for two signals B and C of different intensities with the triggering amplitude designated at A. It can be seen that regardless of the intensity of the incoming signal, the input voltage from microphone 2 is applied to charge capacitor 20 through gate 16 until the prescribed amplitude level is reached. At the instant the amplitude level is reached, the output from tube 60 triggers blocking generator 88 so that gating circuit 16 is operated and the charge remains on capacitor 20. The amplitude of the incoming signal which will provide a full-scale deflection as at 94 on indicator 26 when amplitude A is reached is designated at A' in Figure 3.

To obtain substantially the same radial deflection for signals arriving at all other angles of incidence, the triggering pulse resulting from the combined outputs of the microphones must substantially equal the triggering pulse resulting from the output of either microphone when the explosion signals arrive along the axis thereof. It is readily apparent that if the triggering signal applied to blocking generator 88 from the combined outputs of tubes 60 and 62 reaches the prescribed amplitude A indicated in Figure 4 for signals of any intensity arriving at an angle with respect to the axis of the microphones, then the output of generator 88 will open gating circuits 14 and 16 at a time when the resulting trace is approximately at full scale deflection. During this time, capacitors 18 and 20 are being charged by the outputs from microphones 2 and 4. It has been found that a single determination of the decimal fraction K for a signal arriving at 45° with respect to the axis of microphones 2 or 4, or any multiple thereof, is sufficiently accurate for all other angles of sound incidence. This value of K is determined as follows:

Assuming $E_M$ is the amplified microphone output of an explosion signal arriving at the axis of either of the microphones, and $e_1$ and $e_2$ are the respective input voltages developed across rectifiers 36 and 44 for any angle of sound incidence, and $e_{g1}$ and $e_{g2}$ are the respective input voltages to tubes 60 and 62, then for explosion signals along the axis of microphone 2, (1) $e_1 = E_M$ and $e_2 = 0$ and $e_{g1} = E_M \left( \dfrac{R_0 + KR_0}{R_0 + 2KR_0} \right)$ For signals along the axis of microphone 4, (2) $e_1 = 0$ and $e_2 = E_M$ and $e_{g2} = E_M \left( \dfrac{R_0 + KR_0}{R_0 + 2KR_0} \right)$ For $e_1 = E_M$ and $e_2 = 0$, or vice versa, the combined trigger output $E_{TR}$ from the common output circuits of tubes 60 and 62 may be calculated at follows:

(3) $E_{TR} = A E_M \dfrac{(R_0 + KR_0)}{R_0 + 2KR_0}$

A being a constant including the amplification factor of tubes 60 and 62
Simplifying Equation (3) we have (4) $E_{TR} = A E_M \dfrac{1+K}{1+2K}$ For angles arriving at 45°, (5) $e_1 = .707\, E_M$ and $e_{g1} = 0.707\, E_M \left( \dfrac{1+K}{1+2K} - \dfrac{K}{1+2K} \right)$ (6) $e_2 = .707\, E_M$ and $e_{g2} = 0.707\, E_M \left( \dfrac{1+K}{1+2K} - \dfrac{K}{1+2K} \right)$ Where $$\dfrac{K}{1+2K}$$

is the voltage factor accounting for the drops across resistors 80 and 82.

The combined trigger output $E_{TR}$ is then (7) $$E_{TR} = A(e_{g1} + e_{g2})$$

or (8) $$E_{TR} = \left(\frac{1.414 A E_M}{1+2K}\right)$$

Equating Equations 4 and 8 and solving for K, we have (9) $$A E_M \frac{1+K}{1+2K} = \frac{1.414 A E_M}{1+2K}$$

and

(10) $$K = .414$$

Thus, if $KR_0 = .414\ R_0$, the trigger output applied to blocking signal generator 88 would be of substantially constant amplitude, thereby producing the same radial deflection on indicator 26 for signals arriving along the axis of either microphones as for signals arriving at 45°, or any multiple thereof. By utilizing this value of K derived for 45° in Equation 10 it has been found that the maximum amplitude variation for signals arriving at other angles of incidence is less than 10 percent.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a system for locating the source of explosion waves including two directional microphones of the cosine type having their axes of sensitivity disposed in quadrature for detecting said explosion waves; means responsive to the combined outputs of said microphones and adapted to produce signals of substantially uniform amplitude for explosion waves of equal intensity irrespective of the angle of incidence of said waves; said means comprising first and second full-wave rectifiers responsive respectively to the outputs of each of said microphones, each of said rectifiers having a relatively positive output terminal and a relatively negative output terminal, a first and a second vacuum tube, each normally non-conductive and having discrete input circuits and a common output circuit, said input circuits being respectively connected to the positive output terminals of said rectifiers, four resistors connected in series across said input circuits, said resistors being connected to the negative terminals of each of said rectifiers such that the direct current output of one of said rectifiers flows through the two inner resistors and one end resistor in a prescribed direction and the direct current output of the other of said rectifiers flows through said two inner resistors and the other end resistor in a direction opposite to said prescribed direction, said end resistors being equal in magnitude, and each of said inner resistors being a predetermined decimal fraction of the magnitude of one of said end resistors.

2. In a system for locating the source of explosion waves including two directional microphones of the cosine type having their axes of sensitivity disposed in quadrature for detecting said explosion waves; means responsive to the combined outputs of said microphones and adapted to produce signals of substantially uniform amplitude for explosion waves of equal intensity irrespective of the angle of incidence of said waves; said means comprising a first rectifying means responsive to the output of one of said microphones and having a relatively positive terminal and a relatively negative output terminal, a second rectifying means responsive to the output of the other of said microphones and having a relatively positive output terminal and a relatively negative output terminal, a first and a second vacuum tube, each being normally non-conductive and having a discrete input circuits and a common output circuit, two input terminals connected across each of said input circuits, one input terminal of said first vacuum tube being connected to the positive terminal of said first rectifying means, one input terminal of said second vacuum tube being connected to the positive terminal of said second rectifying means, four resistors connected in series between said positive output terminals, the end resistances being equal and each of the inner resistances being a predetermined decimal fraction of the value of one of said end resistances, said resistors being connected to the respective negative output terminals of said rectifying means such that the direct-current output of said first rectifying means flows through the two inner resistors and one end resistor in a prescribed direction and the direct-current output of said second rectifying means flows through said two inner resistors and the other end resistor in a direction opposite to said prescribed direction, the junction of said inner resistors being common to the remaining input terminal of both of said input circuits.

3. In a system for locating the source of explosion waves including two directional microphones of the cosine type having their axes of sensitivity disposed in quadrature for detecting said explosion waves; means responsive to the combined outputs of said microphones and adapted to produce signals of substantially uniform amplitude for explosion waves of equal intensity irrespective of the angle of incidence of said waves; said means comprising means for rectifying the discrete outputs of said microphones, each rectifying means having a relatively positive output terminal and a relatively negative output terminal, a first and a second vacuum tube, each normally non-conductive and having at least a grid, a plate and a cathode, the grid of said first vacuum tube connected to one of said positive output terminals, the grid of said second vacuum tube connected to the other of said positive output terminals, four resistors connected in series between said grids, the end resistors being of equal magnitude and each of the inner resistors being a predetermined decimal fraction of the value of the magnitude of one of said end resistors, said resistors being connected to the respective negative output terminals such that the direct-current output of one of said rectifying means flows through the two inner resistors and one end resistor in a prescribed direction and the direct-current output of the other of said rectifying means flows through said two inner resistors and the other end resistor in a direction opposite to said prescribed direction, and a resistor connected between the junction of said inner resistors and each of said cathodes.

4. In a system for locating the source of explosion waves including two directional microphones of the cosine type having their axes of sensitivity in quadrature for detecting said explosion waves, a first full wave rectifier responsive to the output of one of said microphones and having a relatively positive output terminal and a relatively negative output terminal, a second full-wave rectifier responsive to the output of the other of said microphones and having a relatively positive output terminal and a relatively negative output terminal, four resistors connected in series across said positive output terminals, the end resistances being equal and each of the inner resistances being a predetermined decimal fraction of the value of one of said end resistances, said resistors being connected to the negative terminals of each of said rectifiers such that the direct-current output of said first rectifier flows through the two inner resistors and one end resistor in a prescribed direction and the direct-current output of said second rectifier flows through said two inner resistors and the other end resistor in a direction opposite to said prescribed direction, a first and a second vacuum tube, each normally non-conductive and having discrete input circuits and a common output circuit, the input circuit of said first tube being responsive to the voltage output developed across one end resistor and the inner resistor adjacent thereto, the input circuit of said second tube being responsive to the voltage output developed across the other end resistor and the inner resistor adjacent thereto, said predetermined decimal fraction being so chosen that the combined output of said first and second vacuum tube is substantially constant in amplitude for explosion waves of equal intensity irrespective of the angle of incidence of said explosion waves.

5. The device set forth in claim 4 wherein said predetermined decimal fraction is 0.414.

6. In a system for locating the source of explosion waves including two directional microphones of the cosine type having their axes of sensitivity in quadrature for detecting said explosion waves, means responsive to the combined outputs of said microphones and adapted to produce signals of substantially uniform amplitude for explosion waves of equal intensity irrespective of the angle of sound incidence, said means comprising a first full wave rectifier responsive to the output of one of said microphones and having a relatively positive output terminal and a relatively negative output terminal, a second full wave rectifier responsive to the output of the other of said microphones and having a relatively positive output terminal and a relatively negative output terminal, four resistors connected in series across said positive output terminals, the end resistances being equal and each of the inner resistances being a predetermined decimal fraction of the value of one of said end resistances, the negative output terminal of said first rectifier being connected to the junction of one end resistor and an inner resistor adjacent thereto, the negative terminal of said second rectifier being connected to the junction of the other end resistor and an inner resistor adjacent thereto, a first and a second vacuum tube, each of said tubes being normally non-conductive and having discrete input circuits and a common output circuit, one end resistor and the inner resistor adjacent thereto being connected across the input circuit of said first vacuum tube, the other end resistor and the inner resistor adjacent thereto being connected across the input circuit of said vacuum tube.

7. In a system for locating the source of wave energy including two directional transducers of the cosine type having their axes of sensitivity in quadrature for detecting said energy, means for rectifying the outputs of each of said transducers to produce two discrete direct-current outputs, four series arranged resistors comprising two end resistors and two inner resistors, the end resistances being equal and each of the inner resistances being a predetermined fraction of one of said end resistances, said resistors being connected across the outputs of said rectifying means such that the direct-current output of one of said rectifying means flows through said two inner resistors and one end resistor and the direct-current output of the other rectifying means flows through said two inner resistors and the other end resistor, means for combining the discrete voltage outputs developed across each of the series circuits comprising an end resistor and an inner resistor adjacent thereto, said predetermined fraction being so chosen that the output from said combining means is substantially constant for explosion waves of equal intensity irrespective of the angle of incidence of said waves.

References Cited in the file of this patent

UNITED STATES PATENTS

| | | |
|---|---|---|
| 1,839,290 | Bailey | Jan. 5, 1932 |
| 2,403,974 | Goodale | July 16, 1946 |
| 2,406,014 | Harry | Aug. 20, 1946 |